(12) United States Patent
Ueda (10) Patent No.: US 9,368,848 B2
(45) Date of Patent: Jun. 14, 2016

(54) ALUMINUM-HALOGEN FUEL CELL (75) Inventor: Mikito Ueda, Hokkaido (JP)

(73) Assignee: Nippon Soda Ltd., Co., Tokyo (JP)

( * ) Notice: Subject to any disclaimer, the term of this patent is extended or adjusted under 35 U.S.C. 154(b) by 206 days.

(21) Appl. No.: 14/233,084

(22) PCT Filed: Jul. 18, 2012

(86) PCT No.: PCT/JP2012/068241
§ 371 (c)(1),
(2), (4) Date: Jan. 15, 2014

(87) PCT Pub. No.: WO2013/012017
PCT Pub. Date: Jan. 24, 2013

(65) Prior Publication Data
US 2014/0178796 A1    Jun. 26, 2014

(30) Foreign Application Priority Data

Jul. 21, 2011  (JP) .................................. 2011-159583
Feb. 1, 2012  (JP) .................................. 2012-020362

(51) Int. Cl.
*H01M 12/00* (2006.01)
*H01M 12/08* (2006.01)
*H01M 14/00* (2006.01)
*C25B 1/24* (2006.01)
(Continued)

(52) U.S. Cl.
CPC ................. *H01M 12/08* (2013.01); *C25B 1/24* (2013.01); *C25B 5/00* (2013.01); *H01M 8/144* (2013.01); *H01M 10/399* (2013.01); *H01M 12/00* (2013.01); *H01M 14/00* (2013.01); *H01M 2300/0045* (2013.01); *H01M 2300/0057* (2013.01)

(58) Field of Classification Search
CPC ... H01M 8/144; H01M 12/08; H01M 10/399; H01M 14/00; H01M 12/00; H01M 16/00; C25B 1/24; C25B 5/00
See application file for complete search history.

(56) References Cited

U.S. PATENT DOCUMENTS 3,071,635 A * 1/1963 Glaser ..................... B01J 27/06
203/68
3,650,834 A    3/1972 Buzzelli
(Continued)

FOREIGN PATENT DOCUMENTS

CN    101771166 A    7/2010
JP    60133669 A    7/1985
(Continued)

OTHER PUBLICATIONS

International Search Report dated Oct. 9, 2012, issued in corresponding PCT Application No. PCT/JP2012/068241.
(Continued)

*Primary Examiner* — Kenneth Douyette
(74) *Attorney, Agent, or Firm* — Kenyon & Kenyon LLP (57) ABSTRACT

An aluminum-halogen fuel cell has a positive electrode (2), a negative electrode (3), and an electrolyte (4) containing an ionic liquid represented by formula (1) or the like. In formula (1), $R^1$ represents an unsubstituted or substituent-containing C1 to C20 alkyl group, $R^2$ represents a C1 to C4 alkyl group or the like, each of $R^3$ and $R^4$ independently represents a hydrogen atom or the like, X represents $AlCl_4$ or the like, and Y represents $Al_2Cl_7$ or the like.

3 Claims, 4 Drawing Sheets

(51) Int. Cl.
  *C25B 5/00* (2006.01)
  *H01M 8/14* (2006.01)
  *H01M 10/39* (2006.01)

(56) References Cited

U.S. PATENT DOCUMENTS

| | | | | |
|---|---|---|---|---|
| 4,104,447 A | * | 8/1978 | Walsh | H01M 10/365 |
| | | | | 252/182.1 |
| 4,122,245 A | | 10/1978 | Nardi et al. | |
| 4,463,072 A | | 7/1984 | Gifford et al. | |
| 5,286,473 A | * | 2/1994 | Hasebe | C01B 3/08 |
| | | | | 423/495 |
| 2004/0105811 A1 | * | 6/2004 | Lind | C01F 7/007 |
| | | | | 423/626 |
| 2004/0221684 A1 | * | 11/2004 | Nam | H01M 4/90 |
| | | | | 75/255 |
| 2008/0220306 A1 | * | 9/2008 | Akiyama | H01M 4/8807 |
| | | | | 429/492 |
| 2008/0319164 A1 | * | 12/2008 | Barreiros | C08H 1/00 |
| | | | | 530/328 |
| 2009/0028766 A1 | * | 1/2009 | Imamura | C01F 7/58 |
| | | | | 423/111 |

FOREIGN PATENT DOCUMENTS

| | | |
|---|---|---|
| JP | 02-152171 | 6/1990 |
| JP | 03-238769 | 10/1991 |
| JP | 05-275120 | 10/1993 |
| JP | 06293991 A | 10/1994 |
| JP | 07-240225 | 9/1995 |
| JP | 07-272755 | 10/1995 |
| JP | 09-120816 | 5/1997 |

OTHER PUBLICATIONS

M. Maeda et al., "Electrowinning of High-pure Metals by an Electrochemical Cycle in Molten Salt; System (Part 3) Evaluation of reduction characteristics in Aluminum-Chlorine Fuel Cell," Proceedings of the 22nd Molten Salt Chemistry Symposium 1-06, 1990, 4 pages.

M. Maeda et al., "Electrowinning of High-pure Metals by an Electrochemical Cycle in Molten Salt; System (Part 4) Development of a New Type Chlorine Electrode in Aluminum-Chlorine Fuel Cell," Proceedings of the 23rd Molten Salt Chemistry Symposium A2-07, 1991, 4 pages.

Dymek, Jr. et al., "An Aluminum Acid-Base Concentration Cell Using Room Temperature Chloroaluminate Ionic Liquids," Proceedings—Electrochemical Society, 84-4, (Advances in Battery Materials and Processes), 1984, pp. 75-84.

P.R. Gifford et al., "An Aluminum/Chlorine Rechargeable Cell Employing a Room Temperature Molten Salt Electrolyte," J. Electrochem. Soc., vol. 135, No. 3, Mar. 1988, pp. 650-654.

CN Office Action issued in CN Appln. No. 201280035402.4, dated Jul. 8, 2015, 10 pages (with English translation).

JP Notice of Allowance issued in JP Appln. No. 2013524736, dated Aug. 18, 2015, 6 pages (with English translation).

Takahashi et al., "Technological and Scientific Issues of Room-Temperature Molten Salts", Plasmas & Ions 2, 1999, pp. 91-105.

G. F. Reynolds et al., "Primary and Secondary Room Temperature Molten Salt Electrochemical Cells", Journal of Power Sources, vol. 15, pp. 109-118.

* cited by examiner

ALUMINUM-HALOGEN FUEL CELL

TECHNICAL FIELD

The present invention relates to a fuel cell (hereafter referred to as an aluminum-halogen fuel cell) which extracts the energy generated when aluminum is halogenated as electrical power.

The present application is a national stage application of International Application No. PCT/JP2012/068241, filed on Jul. 18, 2012, which claims priority on Japanese Patent Application No. 2011-159583, filed Jul. 21, 2011, and Japanese Patent Application No. 2012-020362, filed Feb. 1, 2012, the contents of which are incorporated herein by reference.

BACKGROUND ART

The theoretical energy density of aluminum per unit volume is 8,050 Ah/l, which is equivalent to approximately 4 times that of lithium. Accordingly, if aluminum or an aluminum alloy can be used as the negative electrode of a cell, then a cell having a high energy density can be realized at low cost. Further, because the electrode potential of aluminum is $-1.66$ V (vs. the standard hydrogen electrode), indicating lower potential, by combining aluminum with an appropriate positive electrode active material, there is a possibility of achieving interchangeability with existing cells, and for these reasons, cells using aluminum or an aluminum alloy as the negative electrode are a viable prospect. For example, an acid-base concentration cell using a normal temperature molten salt (ionic liquid) obtained from 1,3-dialkylimidazolium chloride and aluminum chloride as the electrolyte and having aluminum as an electrode is already known (Non-Patent Document 3). Moreover, if scrap aluminum could be reused as cell electrodes, this would be very desirable from the viewpoint of effective utilization of natural resources.

Examples of known cells which use aluminum as the negative electrode include aluminum-halogen fuel cells. These aluminum-halogen fuel cells are cells which extract the energy generated when the aluminum fuel is halogenated as electrical power. For example, Patent Document 1, Non-Patent Document 1 and Non-Patent Document 2 disclose an aluminum-chlorine fuel cell in which a graphite tubular electrode and a molten aluminum electrode are placed in a molten electrolyte at 750° C., chlorine gas is supplied to the graphite tubular electrode, and the electrical power generated between the graphite tubular electrode and the molten aluminum electrode is extracted. In this fuel cell, a mixture of 75% sodium chloride and 25% magnesium chloride is used as the molten electrolyte. In this cell, if the surface of the molten aluminum electrode becomes coated with an oxide film during power generation, then the resistance increases markedly, and the power generation efficiency deteriorates. Accordingly, Patent Document 1 proposes a system in which argon gas is blown onto the molten aluminum electrode, and an electromagnet is used to apply an alternating magnetic field, thereby inhibiting the production of an oxide film and preventing any deterioration in the power generation efficiency.

On the other hand, aluminum chloride or aluminum bromide is produced, for example, by blowing chlorine gas or bromine gas onto molten aluminum metal, sublimating the produced aluminum chloride or aluminum bromide, and then performing cooling. This production requires a large-scale apparatus and a large amount of energy to melt the aluminum metal.

Patent Documents 2 and 3 propose non-aqueous electrolyte secondary cells using aluminum as the negative electrode, in which a non-aqueous electrolyte containing a non-aqueous solvent such as 1,2-dichlorobenzene, an aluminum halide such as aluminum bromide and an organic halide is used.

Examples of the organic halide include quaternary ammonium salts such as trimethylbenzylammonium chloride, quaternary phosphonium salts such as tetra-n-butylphenylphosphonium chloride, N-alkyl substituted pyrrolidinium salts such as N,N-dimethylpyrrolidinium chloride, N-alkyl substituted pyridinium salts such as N-n-butylpyridinium chloride, and N-alkyl substituted imidazolium salts such as 1-ethyl-3-methylimidazolium chloride.

DOCUMENTS OF RELATED ART

Patent Documents

Patent Document 1: Japanese Unexamined Patent Application, First Publication No. Hei 7-240225
Patent Document 2: Japanese Unexamined Patent Application, First Publication No. Hei 7-272755
Patent Document 3: Japanese Unexamined Patent Application, First Publication No. Hei 9-120816

Non-Patent Documents

Non-Patent Document 1: Proceedings of the 22nd Molten Salt Chemistry Symposium (1990) 1-06
Non-Patent Document 2: Proceedings of the 23rd Molten Salt Chemistry Symposium (1991) A2-07
Non-Patent Document 3: Proceedings of the Electrochemical Society (1984), 84-4 (Adv. Battery Mater. Processes), 75-84

SUMMARY OF THE INVENTION

Problems to be Solved by the Invention

In the aluminum-halogen fuel cell disclosed in Patent Document 1, the aluminum and the electrolyte must be heated to a high temperature to achieve a molten state. Further, the high-temperature molten electrolyte and the high-temperature halogen gas are extremely corrosive. Furthermore, because the produced aluminum halide evaporates at temperatures of 120° C. or higher, a special recovery device is necessary.

Accordingly, an object of the present invention is to provide an aluminum-halogen fuel cell that can be operated at temperatures close to normal temperature, and does not suffer from problems such as corrosion. Further, another object of the present invention is to provide a method of producing aluminum chloride or aluminum bromide from scrap aluminum or the like which enables simple separation of the aluminum chloride or aluminum bromide with minimal energy consumption.

Means to Solve the Problems

The present invention includes the aspects described below.
[1] An aluminum-halogen fuel cell having a positive electrode, a negative electrode, and an electrolyte containing an ionic liquid represented by formula (1), formula (2) or formula (3).

[Chemical Formula 1]

(1)

In formula (1), $R^1$ represents an unsubstituted or substituent-containing C1 to C20 alkyl group. $R^2$ represents a hydrogen atom, a C1 to C4 alkyl group, an alkenyl group, or a polymer repeating unit derived from the alkenyl group. Each of $R^3$ and $R^4$ independently represents a hydrogen atom, a halogen atom or a C1 to C4 alkyl group. $R^5$ represents a hydrogen atom or a C1 to C4 alkyl group. X represents $AlCl_4$, $AlBr_4$, $AlCl_3Br$ or $AlClBr_3$. Y represents $Al_2Cl_7$, $Al_2Cl_6Br$, $Al_2Br_7$ or $Al_2ClBr_6$, provided that the combination of X and Y is a combination of $AlCl_4$ and $Al_2Cl_7$, a combination of $AlCl_3Br$ and $Al_2Cl_6Br$, a combination of $AlBr_4$ and $Al_2Br_7$ or a combination of $AlClBr_3$ and $Al_2ClBr_6$. n represents a real number of 0 to 1.

[Chemical Formula 2]

(2)

In formula (2), $R^6$ represents a hydrogen atom or an unsubstituted or substituent-containing C1 to C10 alkyl group. $R^7$ represents a C1 to C4 alkyl group, an alkenyl group, or a polymer repeating unit derived from the alkenyl group. k represents 0 or 1. X, Y and n have the same meanings as X, Y and n in formula (1).

[Chemical Formula 3]

(3)

In formula (3), A represents a nitrogen atom or a phosphorus atom. When A represents a nitrogen atom, each of $R^8$ to $R^{11}$ independently represents a hydrogen atom or an unsubstituted or substituent-containing C1 to C10 alkyl group. When A represents a phosphorus atom, each of $R^8$ to $R^{11}$ independently represents a halogen atom or an unsubstituted or substituent-containing C1 to C20 alkyl group. X, Y and n have the same meanings as X, Y and n in formula (1).

[2] The aluminum-halogen fuel cell disclosed in [1], wherein the negative electrode is formed from scrap aluminum.

[3] The aluminum-halogen fuel cell disclosed in [1] or [2], wherein the temperature of the electrolyte is 40° C. or higher.

[4] The aluminum-halogen fuel cell disclosed in [3], wherein the temperature of the electrolyte is 60° C. or higher.

[5] The aluminum-halogen fuel cell disclosed in any one of [1] to [4], wherein the positive electrode has an uneven surface.

[6] The aluminum-halogen fuel cell disclosed in any one of [1] to [5], wherein the positive electrode is formed from a carbon material.

[7] The aluminum-halogen fuel cell disclosed in any one of [1] to [6], further having a separator between the positive electrode and the negative electrode.

[8] A method of producing aluminum chloride or aluminum bromide, the method using the aluminum-halogen fuel cell disclosed in any one of [1] to [7].

The designations "C1 to C4", "C1 to C10" "C1 to C20", and the like, indicate the number of carbon atoms that constitute that particular group.

Effects of the Invention

The aluminum-halogen fuel cell of the present invention can be operated even at temperatures close to normal temperature, does not suffer from problems such as corrosion, suppresses any reduction in voltage caused by oxide film generation, and can generate high-voltage electricity. Further, by using the aluminum-halogen fuel cell of the present invention, aluminum chloride or aluminum bromide can be produced by a simple solid-liquid separation operation such as filtration, with minimal energy consumption. In the aluminum-halogen fuel cell of the present invention, if scrap aluminum is used as the fuel, then the aluminum can be recycled while performing an energy conversion.

EMBODIMENTS FOR CARRYING OUT THE INVENTION

In order to achieve the objects described above, the inventors of the present invention undertook intensive investigation of electrolytes that could be used in secondary cells. As a result, they discovered that when a specific ionic liquid was used as the electrolyte of an aluminum-halogen fuel cell, the above objects could be achieved. The present invention was completed on the basis of this discovery.

Figure 1:
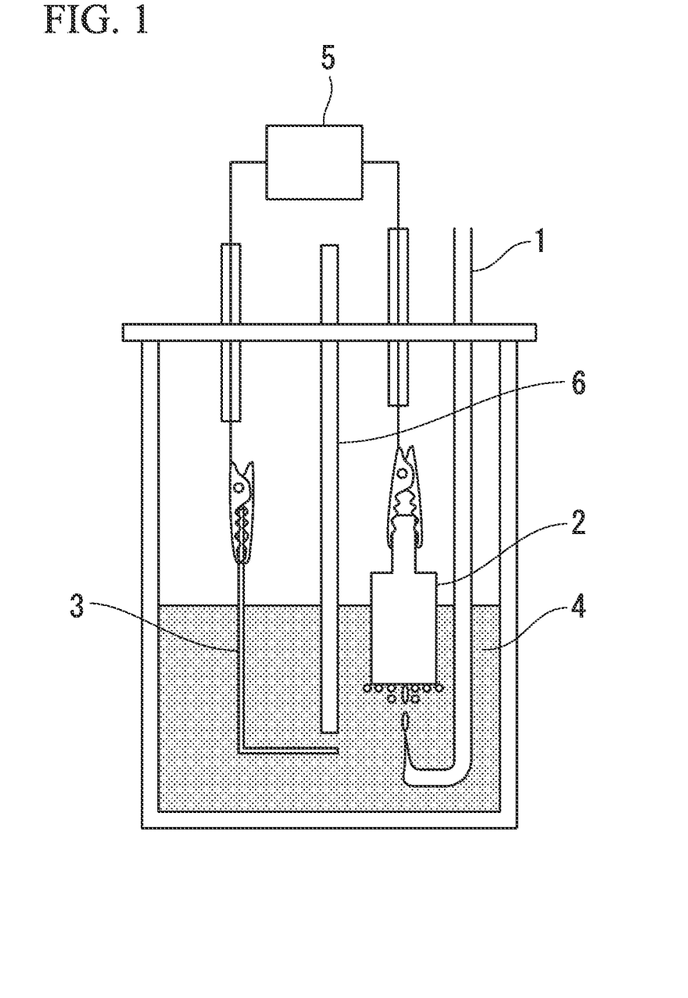
FIG. 1 is a schematic view illustrating one embodiment of a fuel cell according to the present invention.

An embodiment of the aluminum-halogen fuel cell according to the present invention is illustrated in FIG. 1. The aluminum-halogen fuel cell has a positive electrode 2, a negative electrode 3, and an electrolyte 4 containing an ionic liquid.

The electrolyte 4 may contain a solvent in addition to the ionic liquid. There are no particular limitations on the solvent, provided it is stable in relation to the electrode reactions which occur at the positive electrode 2 or the negative electrode 3, and has sufficient conductivity to transport the produced ions. For example, the same types of solvents as those used in non-aqueous lithium secondary cells or the like may be used. In the present invention, it is preferable that a solvent is not used, and the ionic liquid is used alone as the electrolyte 4.

The ionic liquid used in the present invention is represented by formula (1), formula (2) or formula (3).

[Chemical Formula 4]

In formula (1), $R^1$ represents an unsubstituted or substituent-containing C1 to C20 alkyl group. The C1 to C20 alkyl group for $R^1$ may be linear or branched. Specific examples thereof include a methyl group, ethyl group, isopropyl group, n-propyl group, n-butyl group, isobutyl group, s-butyl group, t-butyl group, pentyl group, hexyl group, heptyl group, octyl group, nonyl group, decyl group and hexadecyl group. Among these, a C1 to C6 alkyl group is preferable.

There are no particular limitations on the substituent on the C1 to C20 alkyl group. Specific examples thereof include a halogen atom, alkoxy group, amino group, N-alkyl substituted amino group, alkylsulfenyl group, alkylsulfinyl group, alkylsulfonyl group, hydroxysulfonyl group, acyl group, alkoxycarbonyl group and carboxyl group.

In formula (1), $R^2$ represents a hydrogen atom, a C1 to C4 alkyl group, an alkenyl group, or a polymer repeating unit derived from an alkenyl group.

The C1 to C4 alkyl group for $R^2$ may be linear or branched. Specific examples thereof include a methyl group, ethyl group, isopropyl group, n-propyl group, n-butyl group, isobutyl group, s-butyl group and t-butyl group. Examples of the alkenyl group for $R^2$ include a vinyl group and an allyl group. The polymer repeating unit derived from an alkenyl group is a repeating unit in a polymer main chain obtained by polymerization at a double bond site. An example of the repeating unit is the portion illustrated inside the square brackets in the formula below, wherein a represents the number of repetitions of the unit inside the square brackets, and is preferably a number of approximately 1 to 4.

[Chemical Formula 5]

In formula (1), each of $R^3$ and $R^4$ independently represents a hydrogen atom, a halogen atom, or a C1 to C4 alkyl group. Although there are no particular limitations on the halogen atom, a chlorine atom or a bromine atom is preferable. Examples of the C1 to C4 alkyl group include the same groups as those mentioned above as examples of $R^2$.

In formula (1), $R^5$ represents a hydrogen atom or a C1 to C4 alkyl group, and specific examples thereof include the same groups as those mentioned above as examples of $R^2$.

In formula (1), X represents $AlCl_4$, $AlBr_4$, $AlCl_3Br$ or $AlClBr_3$, and Y represents $Al_2Cl_7$, $Al_2Cl_6Br$, $Al_2Br_7$ or $Al_2ClBr_6$, provided that the combination of X and Y is a combination of $AlCl_4$ and $Al_2Cl_7$, a combination of $AlCl_3Br$ and $Al_2Cl_6Br$, a combination of $AlBr_4$ and $Al_2Br_7$ or a combination of $AlClBr_3$ and $Al_2ClBr_6$. n represents a real number of 0 to 1.

Examples of the ionic liquid represented by formula (1) include 1-ethyl-3-methylimidazolium tetrachloroaluminate, 1-n-propyl-3-methylimidazolium tetrachloroaluminate, 1,3-dimethylimidazolium tetrachloroaluminate, 1-hexyl-3-methylimidazolium tetrachloroaluminate, 1-n-butyl-3-methylimidazolium tetrachloroaluminate, 1-n-pentyl-3-methylimidazolium tetrachloroaluminate, 1-octyl-3-methylimidazolium tetrachloroaluminate, 1-hexadecyl-3-methylimidazolium tetrachloroaluminate, 1,3-dibutylimidazolium tetrachloroaluminate, 1,2,3-trimethylimidazolium tetrachloroaluminate, 1-ethyl-2,3-dimethylimidazolium tetrachloroaluminate, 1-n-butyl-2,3-dimethylimidazolium tetrachloroaluminate, 1-n-propyl-2,3-dimethylimidazolium tetrachloroaluminate, 1,2-dimethyl-3-hydroimidazolium tetrachloroaluminate, ethylene-1,2-bis(3-methyl-1-imidazolium)bistetrachloroaluminate, poly(1-vinyl-3-n-butylimidazolium)poly(tetrachloroaluminate), poly(1-vinyl-3-ethylimidazolium)poly(tetrachloroaluminate), 1-ethyl-4,5-dichloro-3-methylimidazolium tetrachloroaluminate, 1-n-butyl-4,5-dichloro-3-methylimidazolium tetrachloroaluminate, 1-ethyl-2,3-dimethyl-4,5-dichloroimidazolium tetrachloroaluminate, 1-ethyl-5-chloro-3-methylimidazolium tetrachloroaluminate, 1-ethyl-4-chloro-3-methylimidazolium tetrachloroaluminate, 1-(4-hydroxysulfonyl-1-butyl)-3-methylimidazolium tetrachloroaluminate, 1-(4-hydroxysulfonyl-1-butyl)-3-butylimidazolium tetrachloroaluminate, 1-ethyl-3-methylimidazolium tetrabromoaluminate, and 1-butyl-3-methylimidazolium tribromochloroaluminate. Among these, 1-ethyl-3-methylimidazolium tetrachloroaluminate is preferable in terms of electrical conductivity.

In formula (2), $R^6$ represents a hydrogen atom or an unsubstituted or substituent-containing C1 to C10 alkyl group. The C1 to C10 alkyl group for $R^6$ may be linear or branched. Specific examples thereof include a methyl group, ethyl group, isopropyl group, n-propyl group, n-butyl group, isobutyl group, s-butyl group, t-butyl group, pentyl group, hexyl group, heptyl group, octyl group, nonyl group and decyl group. Examples of the substituent on the C1 to C10 alkyl group include the same substituents as those mentioned above as examples of the substituent on the C1 to C20 alkyl group for $R^1$. Among these, $R^6$ is preferably an n-butyl group.

In formula (2), $R^7$ represents a C1 to C4 alkyl group, an alkenyl group, or a polymer repeating unit derived from an alkenyl group. Examples of the C1 to C4 alkyl group for $R^7$ include the same groups as those mentioned above as specific examples of $R^3$ in formula (1). Further, specific examples of the alkenyl group and the polymer repeating unit derived from an alkenyl group include the same groups and repeating units mentioned above as examples of $R^2$ in formula (1). Among these, $R^7$ is preferably a C1 to C4 alkyl group. In formula (2), k represents 0 or 1, and X, Y and n have the same meanings as X, Y and n in formula (1).

Examples of the ionic liquid represented by formula (2) include 1-n-butylpyridinium tetrachloroaluminate, 1-hydropyridinium tetrachloroaluminate, 1-hexylpyridinium tetrachloroaluminate, 1-n-butyl-4-methylpyridinium tetrachloroaluminate, poly(1-n-butyl-vinylpyridinium)poly (tetrachloroaluminate), 1-methylpyridinium tetrachloroaluminate, 1-ethylpyridinium tetrachloroaluminate, 1-n-octylpyridinium tetrachloroaluminate, 1-octyl-2-methylpyridinium tetrachloroaluminate, 1-(2-hydroxysulfonylethyl)pyridinium tetrachloroaluminate, 1-(4-hydroxysulfonyl-n-butyl)pyridinium tetrachloroaluminate, 1-(4-hydroxysulfonyl-n-butyl)-4-methylpyridinium tetrachloroaluminate, and 1-ethylpyridinium tetrabromoaluminate. Among these, 1-n-butylpyridinium tetrachloroaluminate is preferable in terms of electrical conductivity.

In formula (3), A represents a nitrogen atom or a phosphorus atom.

When A represents a nitrogen atom, each of $R^8$ to $R^{11}$ independently represents a hydrogen atom or an unsubstituted or substituent-containing C1 to C10 alkyl group, and specific examples thereof include the same groups as those mentioned above as examples of $R^6$ in formula (2).

When A represents a phosphorus atom, each of $R^8$ to $R^{11}$ independently represents a halogen atom or an unsubstituted or substituent-containing C1 to C20 alkyl group. Although there are no particular limitations on the halogen atom, a chlorine atom or a bromine atom is preferable. Examples of the C1 to C20 alkyl group include the same groups as those mentioned above as examples of $R^1$ in formula (1). In formula (3), X, Y and n have the same meanings as X, Y and n in formula (1).

Examples of the ionic liquid represented by formula (3) include tetrahydroammonium tetrachloroaluminate, tri-n-butyl-methylammonium tetrachloroaluminate, tri-n-octyl-methylammonium tetrachloroaluminate, tetramethylammonium tetrachloroaluminate, methylammonium tetrachloroaluminate, trichloroethylphosphonium tetrachloroaluminate, tri-n-hexyl-tetradecylphosphonium tetrachloroaluminate, and tetrabromophosphonium tetrabromoaluminate. Among these, tetrahydroammonium tetrachloroaluminate and tri-n-butyl-methylammonium tetrachloroaluminate are preferable in terms of their melting points at the usage temperature.

There are no particular limitations on the method used for producing the ionic liquid represented by formula (1), formula (2) or formula (3). For example, the ionic liquid may be obtained by mixing a compound represented by formula (1A), formula (2A) or formula (3A) with $AlCl_3$ (or $Al_2Cl_6$) or $AlBr_3$ (or $Al_2Br_6$), either directly, or following dissolution in an organic solvent. Although there are no particular limitations on the mixing ratio between the two components, the ratio is preferably within a range from 1:2 to 2:1. When the fuel cell according to the present invention is operated, aluminum chloride or aluminum bromide is produced, and this compound dissolves in the ionic liquid and reaches a saturated state.

[Chemical Formula 6]

(1A)

[Chemical Formula 7]

(2A)

[Chemical Formula 8]

(3A)

$R^1$ to $R^{11}$, k and A in formula (1A), formula (2A) and formula (3A) have the same meanings as $R^1$ to $R^{11}$, k and A in formula (1), formula (2) and formula (3). Z represents Cl or Br.

In the aluminum-halogen fuel cell according to the present invention, the temperature of the electrolyte 4 is preferably at least as high as the melting point of the ionic liquid, more preferably 40° C. or higher, still more preferably 50° C. or higher, and most preferably 60° C. or higher. The upper limit for the temperature of the electrolyte 4 is not particularly limited, but is preferably 100° C., and more preferably 80° C.

The aluminum-halogen fuel cell of the present invention uses aluminum as a fuel. Any form of aluminum may be used as the fuel, including primary ingots, secondary ingots, and scrap aluminum. There are no particular limitations on the scrap aluminum, and for example, aluminum products such as used aluminum cans or waste aluminum generated during the production of aluminum products may be used. In the aluminum-halogen fuel cell of the present invention, the aluminum undergoes chlorination or bromination, producing aluminum chloride or aluminum bromide. By purifying this aluminum chloride or aluminum bromide and then performing electrolysis, pure aluminum can be produced. In those cases where scrap aluminum is used, power generation and aluminum recycling can be achieved simultaneously, meaning a system having excellent energy efficiency can be realized. Although the aluminum fuel may be used in the form of a metal ingot, it may also be supplied continuously in a molten state. In such cases, an inert gas is preferably blown into the system to prevent the surface of the molten aluminum from oxidizing. The aluminum fuel functions as the negative electrode 3.

In the aluminum-halogen fuel cell of the present invention, a halogen, and preferably chlorine or bromine, is used to extract electrical power. From the viewpoint of improving the electrical energy extraction efficiency, the chlorine or bromine is preferably supplied to the positive electrode 2 in a gaseous state through a halogen gas inlet line 1.

The changes in voltage before and after introduction of the halogen gas can be confirmed using a voltage meter 5.

Figure 4:
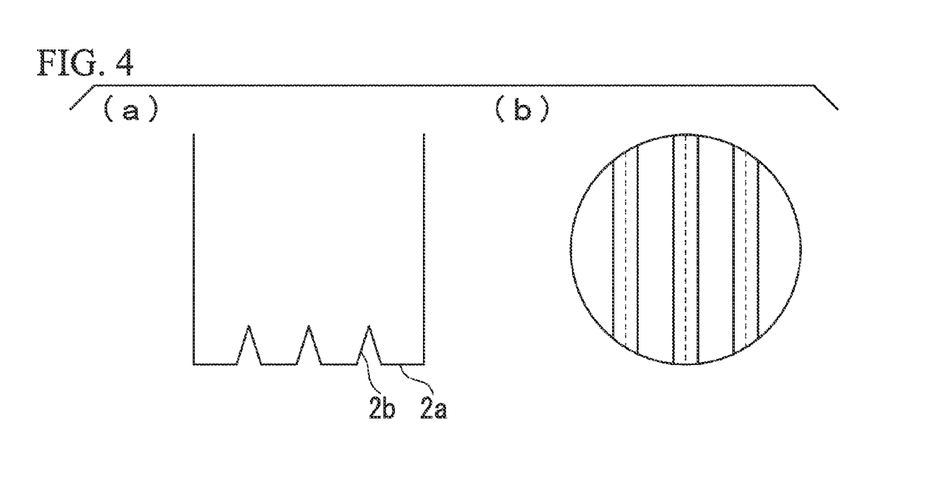
FIG. 4 is a side view (a) and a bottom view (b) illustrating the form of the graphite electrode used in Example 3.

A material that can withstand the corrosive properties of the chlorine or bromine, and preferably a carbon material such as graphite, is used as the positive electrode 2. In order to ensure that the reaction with chlorine or bromine proceeds smoothly on the positive electrode 2, the positive electrode 2 preferably has an uneven surface which increases the surface area of the interface between the positive electrode 2 and the electrolyte 4 (the electrode surface area), and more preferably has a surface roughness (a maximum height Rz measured in accordance with JIS B0601) of 100 to 1,000 µm. In more preferred configuration, by providing the tip of the positive electrode 2 with uneven side surface sections 2b, thereby reducing the surface area of the tip surface section (bottom surface section) 2a, gas retention is inhibited, and the reactivity can be further improved. Examples of this configuration as the positive electrode 2 include an electrode provided with unevenness formed from V-shaped grooves such as that illustrated in FIG. 4, and an electrode provided with unevenness formed by narrowing the diameter of the electrode in a stepwise manner, such as that illustrated in FIG. 5 or FIG. 6. Further, a circular disc-shaped, rod-shaped or plate-shaped electrode provided with fine holes or slits of approximately 3 to 5 mm is also preferable as the positive electrode 2. Furthermore, in order to increase the 3-phase interfacial surface area between the ionic liquid, the halogen and the positive electrode 2, electrodes having interconnected pores of approximately 1 to 5 mm, or sponge-like or porous electrodes having a porosity of 30 to 80% are also preferable as the positive electrode 2. Incorporating carbon fiber or a carbon fiber mesh into the positive electrode 2 is preferable.

In order to avoid direct contact between the halogen and the negative electrode 3, and shorten the distance between the positive electrode 2 and the negative electrode 3 as much as possible, a separator 6 is preferably provided. The separator 6 may be formed from any appropriate material, but a material that does not react with the electrolyte 4 and does not deform upon temperature change is preferable. Specific examples thereof include glass, ceramics and fluororesins. Further, the separator 6 preferably includes a ceramic material having a porosity of 40 to 80%.

Although there are no particular limitations on the operating temperature of the aluminum-halogen fuel cell according to the present invention, the temperature is preferably at least as high as the melting point of the ionic liquid, and is particularly preferably within a range from 20° C. to 70° C. The supply rate of the halogen is adjusted to a level that causes the halogen to accumulate at the positive electrode 2, but ensures that the halogen and the aluminum (the negative electrode 3) do not make direct contact.

As a result of the electrode reactions in the aluminum-halogen fuel cell of the present invention, aluminum chloride or aluminum bromide is produced. The solubility of the produced aluminum chloride or aluminum bromide in the ionic liquid is not particularly high, and therefore it precipitates as crystals or an amorphous substance. The crystals or amorphous substance can be separated from the ionic liquid by filtration or the like.

EXAMPLES

The present invention is described below in further detail using a series of examples, but the present invention is in no way limited by these examples.

Example 1

FIG. 1 illustrates a fuel cell as one embodiment of the present invention. An electrode (aluminum electrode) formed from an aluminum metal plate having a purity of 99.999% that had been polished with a No. 1000 waterproof abrasive paper was used as the negative electrode 3. For the positive electrode 2, a graphite electrode was used (formed with a circular cylindrical shape such as that illustrated in FIG. 1 having a diameter of 15 mm and a surface area of 1.77 cm$^2$, having a contact tab provided at the top, being substantially flat on the bottom surface, and having side surfaces that had been sealed with a Teflon (registered trademark) tape). For the electrolyte 4, 150 ml of an ionic liquid obtained by mixing 1-ethyl-3-methylimidazolium chloride and aluminum chloride in a molar ratio of 2:1 was used.

Figure 2:
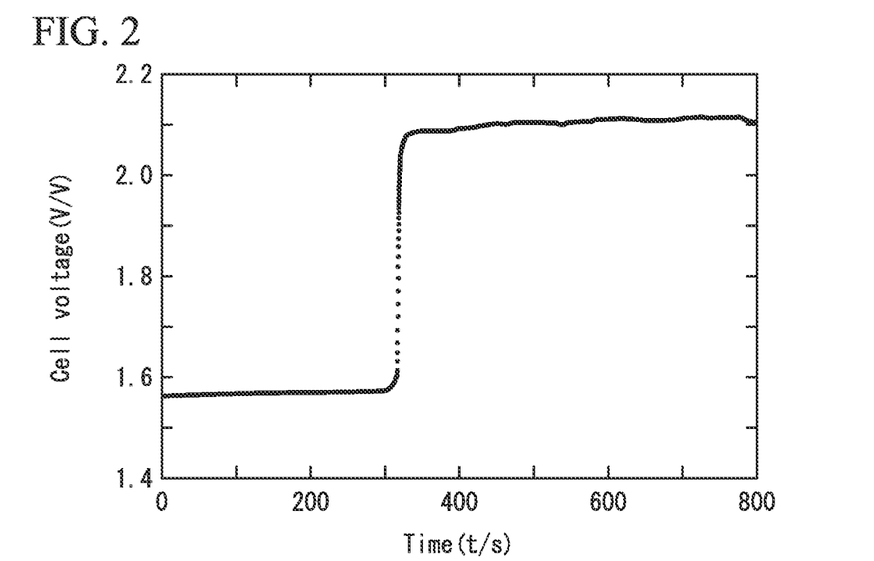
FIG. 2 is a diagram illustrating the change in the voltage difference between the electrodes before and after introduction of chlorine gas into a fuel cell of Example 1.

In order to prevent direct contact between the chlorine gas and the aluminum electrode, a polytetrafluoroethylene separator 6 was provided. The polytetrafluoroethylene separator 6 had low ion permeability, and therefore in order to prevent total separation of the positive electrode 2 and the negative electrode 3, the separator 6 was provided with a gap at the bottom of the container, and the chlorine gas was released from a position higher than the height of this gap. The temperature of the ionic liquid was adjusted to 70° C., and chlorine gas was introduced through the halogen gas (chlorine gas) inlet line 1. The change in voltage was measured using the voltage meter 5. The results are illustrated in FIG. 2. The voltage prior to introduction of the chlorine gas was approximately 1.57 V. When the chlorine gas was introduced, the voltage increased to 2.1 V.

Figure 3:
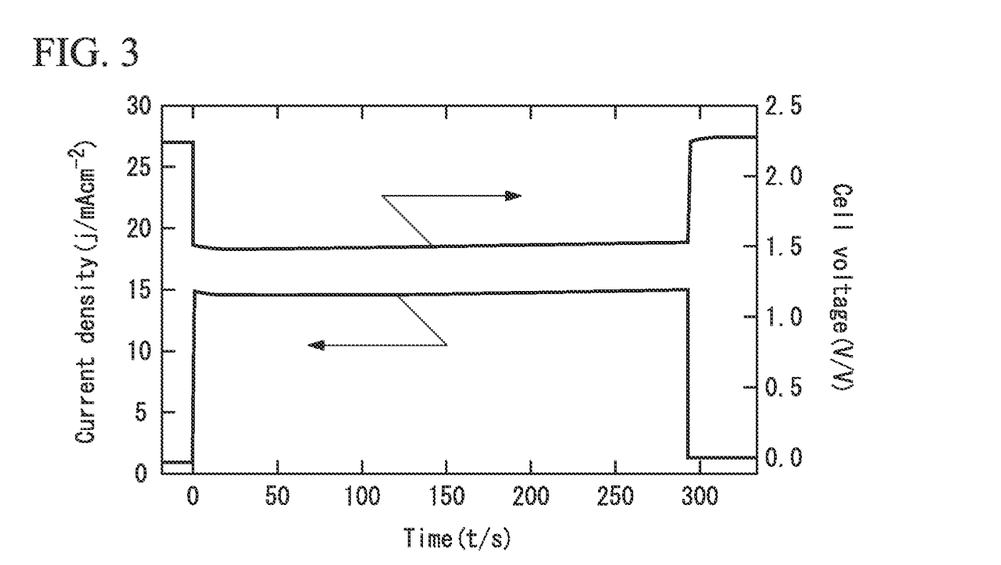
FIG. 3 is a diagram illustrating the changes in voltage and current density between the two terminals of a resistor in an open circuit and a closed circuit (60 resistor).

Next, a 60Ω resistor was connected, via a switch, between the electrodes, in parallel with the voltage meter 5. Chlorine gas was introduced at a temperature of 30° C. through the chlorine gas inlet line 1. The current density and the voltage were measured at the two terminals of the resistor. The results are illustrated in FIG. 3. When the circuit was open, the voltage was 2.2 V and the current density was 0 mAcm$^{-2}$. When the circuit was closed, the voltage was 1.5 V and the current density was 14 mAcm$^{-2}$. When the circuit was reopened, the voltage returned to 2.2 V and the current density returned to 0 mAcm$^{-2}$.

Example 2

With the exception of changing the positive electrode 2 to a graphite electrode having a circular cylindrical shape with a diameter of 21 mm and a surface area of 3.46 cm$^2$, a fuel cell was assembled with the same structure as that described in Example 1.

The temperature of the ionic liquid was set to 30° C., 40° C., or 60° C., and at each temperature, the voltage between the aluminum electrode and the graphite electrode onto which the chlorine was being bubbled was adjusted to 0.5 V, and the current density was measured. The results revealed that the current density was 9.2 mAcm$^{-2}$ at 30° C., 12.2 mAcm$^{-2}$ at 40° C., and 23.7 mAcm$^{-2}$ at 60° C.

Example 3

With the exception of changing the positive electrode 2 to a graphite electrode having a circular cylindrical shape with a diameter of 21 mm and a surface area of 4.24 cm$^2$, a fuel cell was assembled with the same structure as that described in Example 1. The bottom surface of the electrode included three parallel V-shaped grooves such as those illustrated in FIG. 4. The width of each groove was 3.3 mm, the length from the edge of the groove to the bottom thereof was 2.5 mm, the length of the middle groove was 21 mm, and the length of each of the left and right grooves was 18 mm.

In a similar manner to Example 2, the current density at a voltage of 0.5 V was measured when the temperature of the ionic liquid was either 30° C. or 40° C. The results revealed that the current density was 11.1 mAcm$^{-2}$ at 30° C. and 14.3 mAcm$^{-2}$ at 40° C.

Example 4

Figure 5:
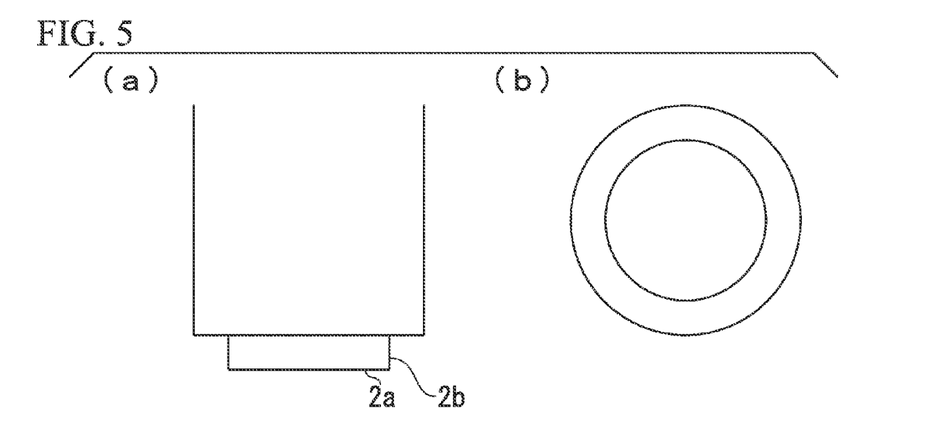
FIG. 5 is a side view (a) and a bottom view (b) illustrating the form of the graphite electrode used in Example 4.

With the exception of changing the positive electrode 2 to a graphite electrode having a circular cylindrical shape with a diameter of 21 mm and a surface area of 4.17 cm2, a fuel cell was assembled with the same structure as that described in Example 1. The bottom surface of the electrode included a portion which narrowed in a stepwise manner over a height of 1.5 mm to a diameter of 15 mm, as illustrated in FIG. 5.

In a similar manner to Example 2, the current density at a voltage of 0.5 V was measured when the temperature of the ionic liquid was either 30° C. or 40° C. The results revealed that the current density was 10.8 mAcm-2 at 30° C. and 16 mAcm-2 at 40° C.

Example 5

Figure 6:
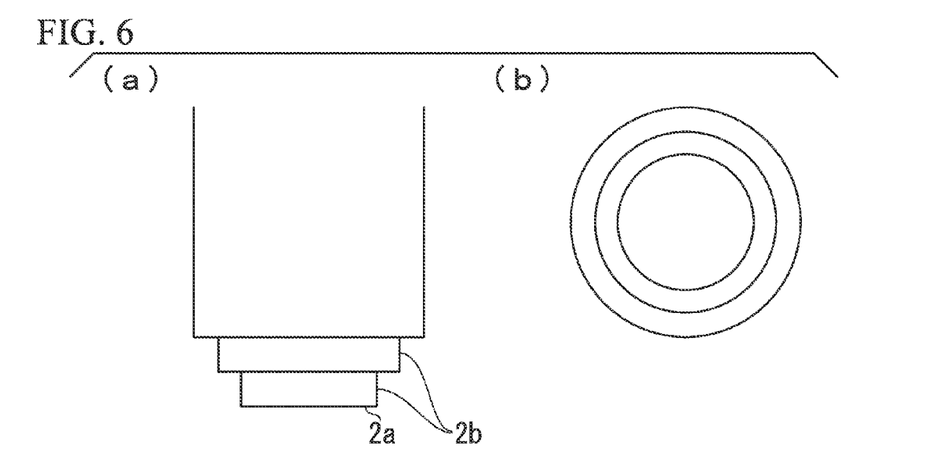
FIG. 6 is a side view (a) and a bottom view (b) illustrating the form of the graphite electrode used in Example 5.

With the exception of changing the positive electrode 2 to a graphite electrode having a circular cylindrical shape with a diameter of 21 mm and a surface area of 4.87 cm2, a fuel cell was assembled with the same structure as that described in Example 1. The bottom surface of the electrode had a shape which narrowed in a stepwise manner, first to a diameter of 17 mm, and then to a diameter of 13 mm, with each step having a height of 1.5 mm, as illustrated in FIG. 6.

In a similar manner to Example 2, the current density at a voltage of 0.5 V was measured when the temperature of the ionic liquid was either 30° C. or 40° C. The results revealed that the current density was 9.3 mAcm-2 at 30° C. and 16.2 mAcm-2 at 40° C.

Based on these results, it was evident that the current density increased as the temperature of the ionic liquid was raised. Further, it was also evident that the current density changed depending on the uneven shape and the surface area of the electrode.

Example 6

Figure 7:
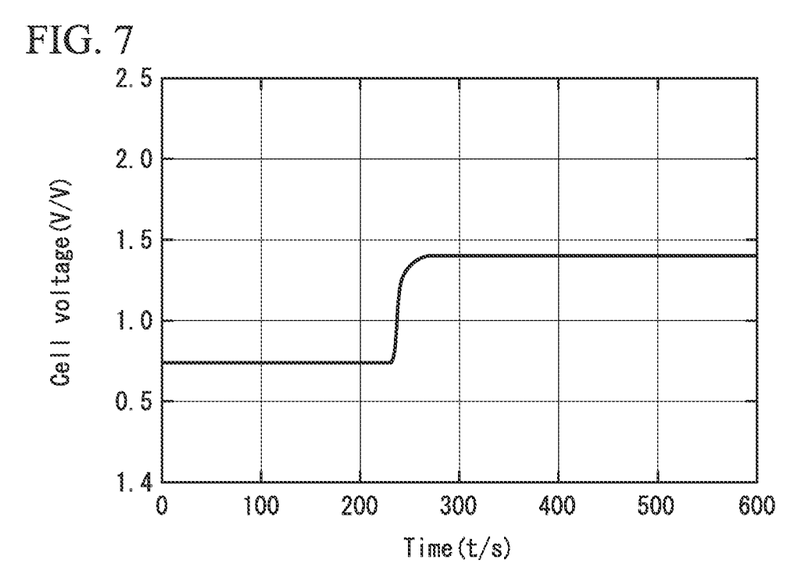
FIG. 7 is a diagram illustrating the change in the voltage difference between the electrodes before and after introduction of chlorine gas into a fuel cell of Example 6.

With the exceptions of using, as the electrolyte 4, an ionic liquid obtained by mixing 1-butylpyridinium chloride (BPC) and aluminum chloride in a molar ratio of 2:1, and adjusting the temperature to 30° C. before introducing the chlorine gas, the change in voltage was measured in the same manner as Example 1. The results are illustrated in FIG. 7. The voltage prior to introduction of the chlorine gas was approximately 0.75 V. When the chlorine gas was introduced, the voltage increased to approximately 1.4 V.

Figure 8:
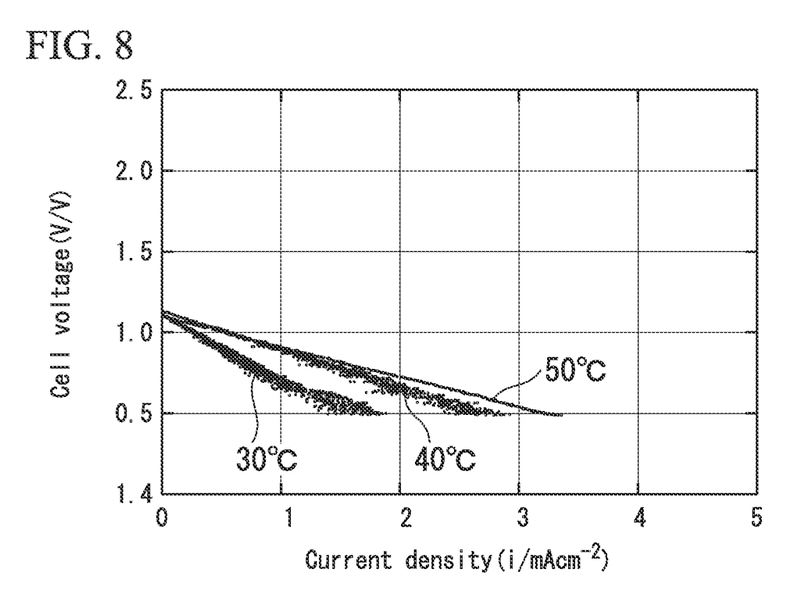
FIG. 8 is a diagram illustrating the relationship between the current and the voltage at various temperatures in the fuel cell of Example 6.

Next, the temperature of the electrolyte 4 was set to 30° C., 40° C., or 50° C., and chlorine gas was introduced through the chlorine gas inlet line 1. The voltage between the aluminum electrode and the graphite electrode onto which the chlorine was being bubbled was adjusted to 0.5 V, and the current density was measured. The results are illustrated in FIG. 8. When the chlorine gas was introduced at a temperature of 50° C., extremely stable measurement values were obtained, and the reduction in voltage accompanying the increase in current density could be markedly suppressed.

INDUSTRIAL APPLICABILITY

The aluminum-halogen fuel cell of the present invention can be operated even at temperatures close to normal temperature, does not suffer from problems such as corrosion, suppresses any reduction in voltage caused by oxide film generation, and can generate high-voltage electricity. Further, by using the aluminum-halogen fuel cell of the present invention, aluminum chloride or aluminum bromide can be produced by a simple solid-liquid separation operation such as filtration, with minimal energy consumption. In the aluminum-halogen fuel cell of the present invention, if scrap aluminum is used as the fuel, then industrially useful aluminum chloride can be produced while performing energy conversion, and by subjecting this aluminum chloride to electrolysis, the aluminum can be recycled.

DESCRIPTION OF THE REFERENCE SIGNS

1: Halogen (chlorine) gas inlet line
2: Positive electrode (graphite electrode)
2a: Tip surface section (bottom surface)
2b: Uneven side surface section
3: Negative electrode (aluminum electrode)
4: Electrolyte (ionic liquid)
5: Voltage meter
6: Separator

The invention claimed is:
1. A method of producing aluminum chloride or aluminum bromide, the method comprising precipitating aluminum chloride or aluminum bromide in an ionic liquid using the aluminum-halogen fuel cell comprising:
 a positive electrode;
 a negative electrode; and
 an electrolyte comprising an ionic liquid of formula (1), formula (2), or formula (3):

(3)

wherein,
$R^1$ represents an unsubstituted or substituent-containing C1 to C20 alkyl group,
$R^2$ represents a hydrogen atom, a C1 to C4 alkyl group, an alkenyl group, or a polymer repeating unit derived from the alkenyl group,
each of $R^3$ and $R^4$ independently represents a hydrogen atom, a halogen atom or a C1 to C4 alkyl group,
$R^5$ represents a hydrogen atom or a C1 to C4 alkyl group,
$R^6$ represents a hydrogen atom or an unsubstituted or substituent-containing C1 to C10 alkyl group,
$R^7$ represents a C1 to C4 alkyl group, an alkenyl group, or a polymer repeating unit derived from the alkenyl group,
k represents 0 or 1,
A represents a nitrogen atom or a phosphorus atom, wherein
when A represents a nitrogen atom, each of $R^8$ to $R^{11}$ independently represents a hydrogen atom or an unsubstituted or substituent-containing C1 to C10 alkyl group, and
when A represents a phosphorus atom, each of $R^8$ to $R^{11}$ independently represents a halogen atom or an unsubstituted or substituent-containing C1 to C20 alkyl group, and
$(X^-)_n(Y^-)_{1-n}$ represents $(AlCl_4^-)_n(Al_2Cl_7^-)_{1-n}$, $(AlCl_3Br^-)_n(Al_2Cl_6Br^-)_{1-n}$, $(AlBr_4^-)_n(Al_2Br_7^-)_{1-n}$, or $(AlClBr_3^-)_n(Al_2ClBr_6^-)_{1-n}$, and
n represents a real number of 0 to 1.

2. The method according to claim 1, wherein a temperature of an electrolyte of the aluminum-halogen fuel cell is 40° C. or higher.

3. The method according to claim 2, wherein the temperature is 60° C. or higher.

* * * * *